US006403379B1

(12) United States Patent
Munson et al.

(10) Patent No.: US 6,403,379 B1
(45) Date of Patent: Jun. 11, 2002

(54) REACTOR PLATE WASHING STATION

(75) Inventors: Mark Munson, Louisville; Adam Cook, Longmont; Philip Loudin, Boulder, all of CO (US)

(73) Assignee: Array BioPharma, Boulder, CO (US)

( * ) Notice: Subject to any disclaimer, the term of this patent is extended or adjusted under 35 U.S.C. 154(b) by 0 days.

(21) Appl. No.: 09/390,251

(22) Filed: Sep. 3, 1999

(51) Int. Cl.[7] ................................................ G01N 35/10

(52) U.S. Cl. ......................... 436/43; 422/101; 422/102; 422/99; 422/65; 436/49

(58) Field of Search ............................ 422/102, 99, 65, 422/101; 436/43, 49; 134/170, 172, 22.19, 22.18, 24, 25.1

(56) References Cited

U.S. PATENT DOCUMENTS

| | | | | |
|---|---|---|---|---|
| 4,390,111 A | | 6/1983 | Robbins et al. | 220/259 |
| 4,444,598 A | | 4/1984 | Sakagami | 134/22.12 |
| 4,622,076 A | * | 11/1986 | Ling | 134/32 |
| 4,639,242 A | | 1/1987 | Babson | 494/37 |
| 4,670,061 A | * | 6/1987 | Harlegard | 134/18 |
| 4,755,356 A | | 7/1988 | Robbins et al. | 422/102 |
| 4,931,400 A | * | 6/1990 | Jitsukawa | 435/287 |
| 5,078,164 A | * | 1/1992 | Doellgast | 134/166 R |
| 5,079,141 A | | 1/1992 | Niskanen et al. | 435/7.34 |
| 5,120,503 A | | 6/1992 | Hinckley et al. | 422/102 |
| 5,350,458 A | | 9/1994 | Pinsl-Ober et al. | 134/22.1 |
| 5,380,662 A | | 1/1995 | Robbins et al. | 435/312 |
| 5,564,826 A | | 10/1996 | Neumann et al. | 366/219 |
| 5,669,638 A | | 9/1997 | Anderson et al. | 292/111 |
| 5,721,141 A | * | 2/1998 | Babson et al. | 436/49 |
| 5,803,987 A | | 9/1998 | DeWitt et al. | 134/25.4 |
| 5,814,277 A | | 9/1998 | Bell et al. | 422/67 |
| 5,840,253 A | | 11/1998 | Chase et al. | 422/63 |
| 5,843,385 A | | 12/1998 | Dugan | |
| 5,882,597 A | * | 3/1999 | Astle | 422/65 |
| 5,885,529 A | | 3/1999 | Babson et al. | 422/65 |
| 5,885,530 A | | 3/1999 | Babson et al. | 422/65 |
| 5,916,526 A | | 6/1999 | Robbins | 422/102 |

OTHER PUBLICATIONS

Robbins Scientific Corporation, FlexChem™ Organic Synthesis System catalog dated 3/98, pp. 1–6.

* cited by examiner

*Primary Examiner*—Nina Bhat
(74) *Attorney, Agent, or Firm*—McDonnell Boehnen Hulbert & Berghoff

(57) ABSTRACT

Provided is a manually operated wash station that can simultaneously apply a wash process to multiple cells of a multi-well synthesis reactor plate. Further provided is a manually operated wash station that can be adapted to automatic computer control. A method for simultaneously washing a plurality of wells in a multi-well container is provided. Additionally, a method for purifying a plurality of chemical products simultaneously in a multi-well reactor plate.

20 Claims, 3 Drawing Sheets

REACTOR PLATE WASHING STATION

BACKGROUND OF THE INVENTION

1. Field of the Invention

This invention relates to a device and method for washing a plurality of wells in a multi-well container. This invention further relates to adapting such a washing device to automatic computer control. The present invention also relates to a method for purifying a plurality of chemical products simultaneously in a multi-well reactor plate.

2. Summary of the Related Art

With the increasing interest of biological and chemical libraries in recent years, multi-well containers have become a useful tool in research and clinical procedures for the screening and evaluation of multiple samples and for the synthesis of chemical compounds on a micro scale.

Multi-well plates typically have a plurality of plastic tubes arranged in rectangular planar arrays of 6×8, 8×12, or 16×24. This allows the researcher or clinician to perform multiple experiments at the same time. The tubes of the multi-well container are usually compartmentalized or subdivided, each tube equally spaced from the next within the rectangular array. The tubes or wells are interconnected in some way via a base, which itself is made of some material impervious to water. For example, the wells can be molded directly into the base. Recently, an improved multi-well container has been designed wherein each tube or well has its own walls or septa, providing less of a chance of cross-contamination of wells (Robbins, U.S. Pat. No. 5,916, 526).

Other multi-well plates may be positioned in circular arrays on turntables to allow for automation of chemical and biological experiments through the use of a probe affixed to a rotating arm (Bell et al., U.S. Pat. No. 5,814,377). While robotic systems have been developed for the addition(and withdrawal of chemical substances from individual tubes of a multi-well plate, the plate washing process is still performed manually or semi-annually on individual tubes. Such manual operation is very time consuming and subject to error, particularly with chemical assays. Specifically, unreacted starting materials must be washed from each cell to isolate the desired product so as to subject it to further chemical processes. The washing process usually involves rinsing each cell with a solvent and then removing the resulting unwanted solution. This step is repeated as often as necessary, usually employing a different solvent each time.

Many washing stations for various biological and chemical multi-assay devices have been developed. For example, U.S. Pat. No. 5,803,987 discloses a washing station for multiple dispensing and aspirating probes used in robotic systems involved in chemical synthesis. Other devices are used to wash blood cells by separating the unreacted reagents and cellular debris from the cells of interest (Chase et al., U.S. Pat. No. 5,840,253). Another device provides for a method for washing a U-shaped reaction tube by supplying and subsequently discharging a washing liquid twice, the second time at a slower rate than the first time to assure that none of the washing liquid remains on the inner wall of the tube (Sakagami et al., U.S. Pat. No. 4,444,598).

U.S. Pat. No. 4,931,400 discloses a device for pouring washing water onto a multi-well plate. The device consists of a tank with orifices to accommodate the wells of a plate. Water is forced into each of the wells from an inlet by a pushable surface portion made of elastic synthetic resin which, when force is applied downwardly, serves to eject the water simultaneously from the orifices into the respectively facing wells of the multi-well plate.

The drawback of the above-mentioned devices are that they do not provide for the application and removal of multiple washing solvents from multiple tubes in a multi-well plate in a simultaneous and efficient manner. This is particularly important with chemical reactor plates, where unreacted starting materials materials need to be removed from the desired product in the cells. An efficient and economic wash station that can chemically wash unreacted constituents out of each cell simultaneously, while leaving the desired product intact, is desired.

SUMMARY OF THE INVENTION

The present invention provides a washing station for a multi-well synthesis reactor plate. Specifically, it is an object of the invention to provide a manually operated wash station that can simultaneously apply a wash process to multiple cells of a multi-well synthesis reactor plate. It is another object of the invention to adapt a manually operated wash station to automatic computer control, thereby executing the wash process automatically after having been loaded and started manually. It is a further object of the invention to provide a method for simultaneously washing a plurality of wells in a multi-well container. It is yet another object of the invention to provide a method for purifying a plurality of chemical products simultaneously in a multi-well reactor plate.

The present invention provides a washing station for washing a plurality of cells in a multi-well container having one or more solvent control valves for controlling the flow of solvent into the wash station. The solvent control valves are in turn connected to a solvent manifold. The solvent manifold is also connected to an upper housing having at least one solvent distribution chamber in communication with the solvent manifold. A nozzle plate is positioned adjacent to the upper housing and against a respective solvent distribution chamber. A plurality of nozzles is connected to each nozzle plate. A receptacle having a solvent collection chamber capable of holding a reactor plate containing a plurality of reaction cells is provided for each solvent distribution chamber. The receptacle can be positioned with respect to the upper housing such that each reaction cell is aligned with one of the nozzles. A positive pressure control valve provides positive pressure to restrict flow of solvent out of the reaction cells and into the solvent collection chamber. Also, a negative pressure control valve provides a negative pressure to remove solvent from the reaction cells.

The present invention also provides a method for simultaneously washing a plurality of reaction cells in a multi-well reactor plate. At least one reactor plate with a plurality of reaction cells is placed into a solvent collection chamber of a receptacle. Then, the receptacle is moved into a position directly underneath an upper housing. The upper housing and receptacle are moved together such that they form a seal between the each reactor plate and the respective solvent collection chamber. At this point, each reaction cell of each reactor plate is aligned with a nozzle of a nozzle plate positioned between the upper housing and the receptacle. Positive pressure is then applied to each solvent collection chamber followed by the turning on of one or more solvent control valves until a desired amount of solvent or solvents is present in each reaction cell. The solvent is allowed to remain in the reaction cells for a period of time as is necessary to clean the cells. Negative pressure is then applied to each solvent collection chamber before the solvent is subsequently removed from the reaction cells.

The present invention also provides for a method for purifying a desired product in a multi-well reactor plate. Chemical compounds are formulated in a plurality of cells in a reactor plate to set up a plurality of chemical reactions. The chemical reactions are allowed to proceed to completion to afford a desired product, a resin support material to which the product is bound chemically, and unreacted constituents. The unreacted constituents are then removed by employing a wash station as mentioned above. Finally, the resin support material is cleaved from the desired product.

The invention will be better understood with the reference to the specification, accompanying drawings and specific examples.

DETAILED DESCRIPTION OF THE INVENTION

Figure 1:
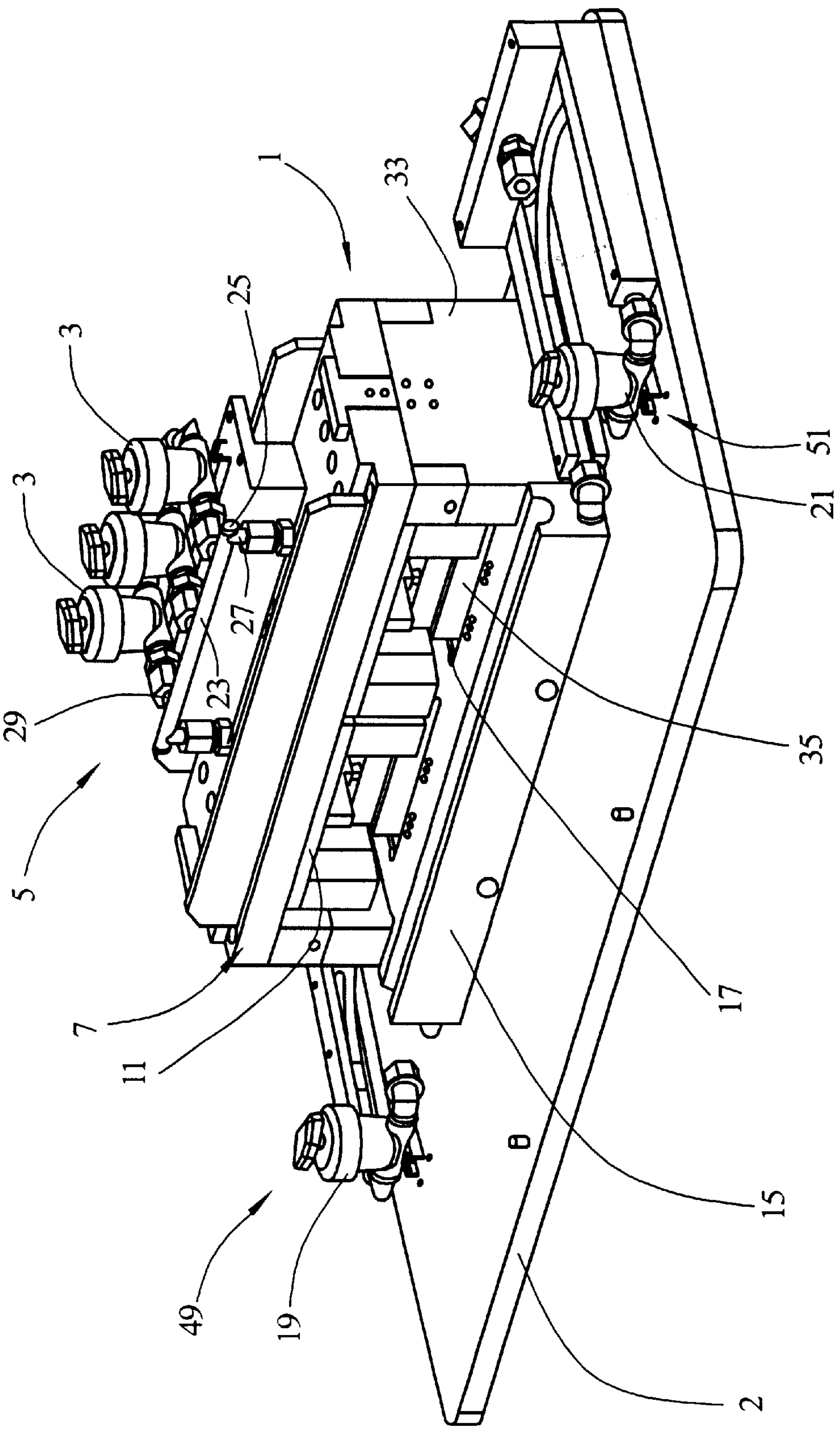
FIG. 1 is a perspective view of an embodiment of a wash station of the present invention having three solvent control valves and two solvent distribution chambers.
Figure 2:
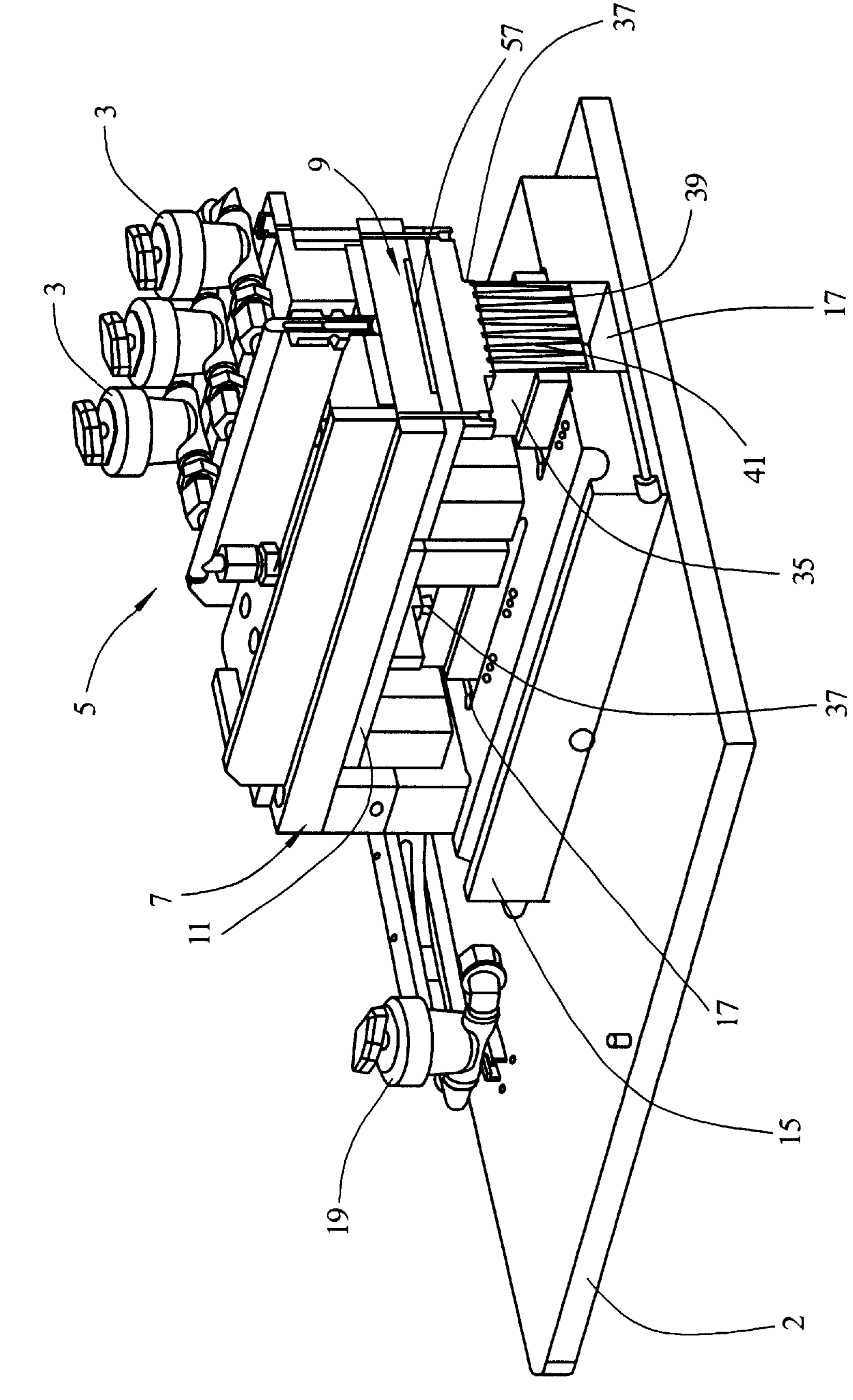
FIG. 2 is a cross-section view of the wash station depicted in FIG. 1, taken along line A—A.
Figure 3:
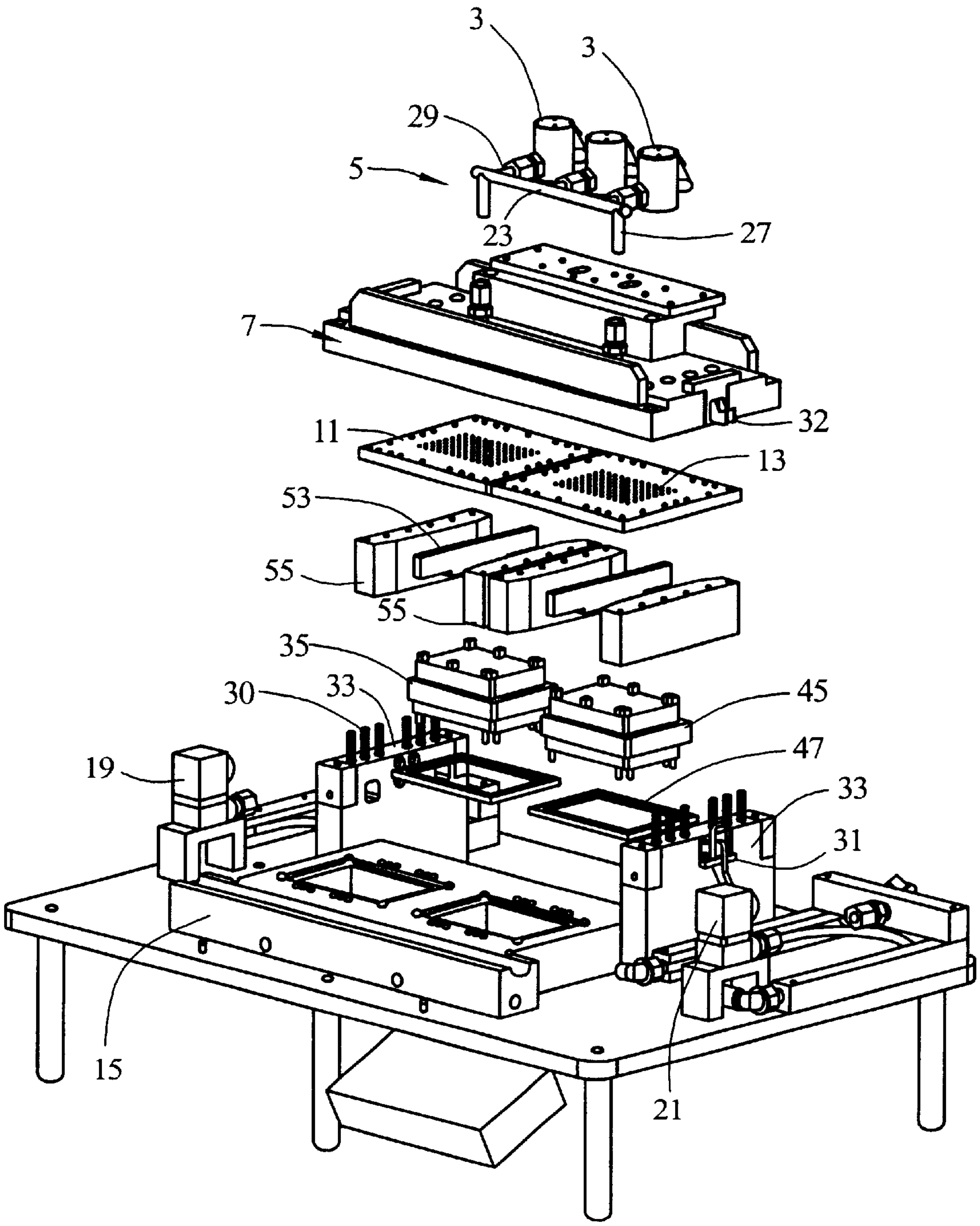
FIG. 3 is an exploded perspective view of an embodiment of a wash station of the present invention.

FIGS. 1, 2 and 3 illustrate a preferred embodiment of the washing station 1 of the present invention. The washing station 1 comprises one or more solvent control valves 3, a solvent manifold 5, an upper housing 7, one or more solvent distributions chambers 9, one or more nozzle plates 11, a plurality of nozzles 13, a receptacle 15, one or more solvent collection chambers 17, a positive pressure assembly 49, and a solvent removal assembly 51.

As seen in FIGS. 1 and 2, the solvent manifold 5 is preferably, but not necessarily, a tubular shaped member having a manifold body 23 with opposing manifold ends 25. The solvent manifold 5 is hollow throughout and includes at least one end finger member 27 at each manifold end 25 and one or more valve linking finger members 29 along the manifold body 23 between the manifold ends 25. Each valve linking finger member 29 is attached to a solvent control valve 3. The solvent control valves 3 are responsible for regulating the flow of a solvent into the wash station a from solvent tanks (not shown). The solvent manifold 5 is preferably made of material impervious to organic and inorganic solvents. Preferably, the solvent manifold 3 is made of material that is transparent so that solvent flow can be observed to determine whether the washing station 1 is working properly (e.g. the presence of air in the system can be detected with a transparent solvent manifold 3). Examples of such material are solvent resistant plastic and glass. It should be understood, however, that nontransparent material, such as, for example, stainless steel can also be employed. Most preferably, the solvent manifold 3 is made of glass. The solvent control valves 3 are also generally made of solvent-resistant material, such as Teflon, stainless steel and ultra high weight polyethylene or polypropylene. Most preferably, the solvent control valves 3 are made of Teflon.

Each end finger member 27 of the manifold body 5 is connected to a respective solvent distribution chamber 9 within an upper housing 7. As seen in FIG. 2, recesses machined into the lower surface of the upper housing 7 form the respective solvent distribution chambers 9. The solvent distribution chambers 9 are closed off at the bottom by nozzle plates 11. Each nozzle plate 11 is made of material impervious to organic and inorganic solvent, preferably ultra high molecular weight polyethylene or Teflon. As shown in FIG. 3, each nozzle plate 11 contains a plurality of solvent nozzles 13, which are press fit into each of the nozzle plates 11. The nozzles 13 are very small with an internal diameter preferably in the range of about 0.005 and 0.020 inches and more preferably about 0.010 inches. This small internal diameter allows for sufficient capillary resistance to flow to keep the solvent from dripping when the solvent control valves 3 are closed. The nozzles 13 are also preferably made of material impervious to organic and inorganic solvents, such as, for example, stainless steel. Similarly, the upper housing 7 is made of material impervious to organic and inorganic solvent, preferably ultra high molecular weight polyethylene, stainless steel or Teflon.

In a preferred embodiment of the invention, the upper housing 7 can exist in two states, an upward state and a downward state. As shown in FIG. 3, one or more springs 30 are mounted at one end to the upper housing 7 and at another end to a respective side wall 33, the side walls 33 in turn are mounted to a base 2. The springs 30, when relaxed, bias the upper housing 7 and keep the upper housing 7 in the upward state. Two toggle clamps 31, one mounted on each of the side walls 33, together with a respective toggle clamp bracket 32 mounted on the upper housing 7, force the upper housing 7 into the downward state. While the upper housing 7 is in the downward state and the toggle clamps 31 are subsequently locked into their respective toggle clamp brackets 32, the bottom side of the upper housing 7 rests against the top side of each side wall 33, with the upper housing 7 being perpendicular to the side walls 33.

The receptacle 15 is made of material impervious to organic and inorganic solvent, preferably ultra high molecular weight polyethylene, stainless steel or Teflon. The receptacle 15 contains rectangular-shaped pockets, or solvent collection chambers 17, the depth of which are approximately equivalent to the height of the receptacle 15. The length and width of the solvent collection chambers 17 are preferably such that they can accommodate one reactor plate 35 each. Reactor plates 35 can be placed into their respective solvent collection chambers 17 when the receptacle 15 is pulled out from under the upper housing 7 to its loading position, operating similar to a drawer. Each reactor plate 35 has an outer perimeter skirt 45. Lowering the upper housing 7 to the downward state with the toggle clamps 31 provides force against the outer perimeter skirt 45 of the reactor plate 35 so as to form a tight seal between the skirt 45 and a flexible gasket 47 made of a thermoplastic rubber, preferably Santoprene, affixed to the top of the chamber 17. The receptacle 15, in turn, rests on a base 2 while in the loading position. The base 2 is also made of material impervious to organic and inorganic solvent, preferably ultra high molecular weight polyethylene.

The receptacle 15 with reactor plates 35 installed can be manually slid underneath the upper housing 7 while the upper housing 7 is in the upward state. As the upper housing 7 is lowered, tapered alignment pins 37 engage a plurality of unused cells 39 in the reactor plates 35, pulling reaction cells 41 into precise alignment with the plurality of nozzles 13 in the nozzle plates 11. This assures that when the solvent exits the nozzles 13 it is directed accurately into the respective reactor cell 41. While alignment pins 37 are shown in FIG. 2 as being positioned near the center of the reactor plates 35 for ease of illustration, preferably a pair of alignment pins 37 are positioned in a pair of respective unused cells 39 in the first and last columns (i.e., at the ends) of each reactor plate 35. It should be understood, however, that any desirable number and/or position of the alignment pins may be used with the wash station of the present invention.

Each solvent collection chamber 17 can be equipped with a positive pressure assembly 49 to keep solvent from draining out of the reaction cells 41 and into the solvent collection chamber 17. In a preferred embodiment of the invention, two solvent collection chambers 17 are connected to a positive pressure control valve 19, which controls and provides the positive pressure within the solvent collection chambers 17. Although not shown, the positive pressure may be supplied by a positive pressure source with various inert gases, such as nitrogen or argon.

In addition, each solvent collection chamber 17 can be equipped with a solvent removal assembly 51. In a preferred embodiment of the invention, each solvent collection chamber is connected to a negative pressure control valve 21 that controls and provides the negative pressure within the solvent collection chambers 17. Although not shown, the negative pressure may be supplied by a negative pressure source, such as a vacuum or the like.

A preferred operating sequence comprises placing a reactor plate 35 into each of two solvent collection chambers 17 of the receptacle 15, while the receptacle 15 is pulled out from under the upper housing 7. At this point, the upper housing 7 is in the upward state, or loading position. While the upper housing 7 remains in the loading position, the receptacle 15 is then slid underneath the upper housing 7 into the working position. The upper housing 7 is then drawn downward with the two toggle clamps 31 clamping the upper housing 7 to the reactor plates 35. Examples of clamps suitable with the present invention are the latch clamps manufactured and sold by Carr Lane Manufacturing Co., located in St. Louis, Mo.

As mentioned above, the lowering of the upper housing 7 to the downward state, together with the clamping of the toggle clamps 31, creates a tight seal between the skirt 45 of each reactor plate 35 and the receptacle 15 via a flexible gasket 47, as shown in FIG. 3. The positive pressure control valve 19 is then turned to an on position to allow positive pressure, i.e., nitrogen back pressure gas, to enter the solvent collection chamber 17. The solvent valve 3 is then turned to an on position to allow the solvent to flow from a solvent source (not shown) through the solvent control valve 3 and into the solvent manifold 5 via the valve linking finger member 29. The solvent continues to the solvent distribution chamber 9 via the end finger member 27. The nozzles 13 in the nozzle plate 11 allow the solvent to flow equally through each of the nozzles 13 in each chamber 9 and into each cell 41 aligned with the respective nozzle. Preferably, but not necessarily, the nozzles 13 are positioned approximately one-eighth of an inch away from the cells 41 when the upper housing 7 is in the downward state.

The solvent valve 3 is turned to an off position when all the cells 41 are sufficiently filled with solvent. With multiple solvents being used, a first solvent may be allowed to "dwell" for some time in the cells 41, creating a "dwell" time. During the "dwell" time, the collection chamber 17 is pressurized with from about 1.0 to 5.0 psi of nitrogen, preferably about 2.5 psi, by turning the positive pressure control valve 19 to the on position. This positive pressure is sufficient to keep the solvent from draining out of the cells 41 and into the collection chamber 17. Once the "dwell" time expires, positive pressure control valve 19 is turned off and the negative pressure control valve 21 is subsequently turned on. The negative pressure sucks and forces the solvent out of the cells 41, and into and out of the collection chamber 17.

In a preferred embodiment of the invention, the solvent manifold 5 contains three valve linking finger members 29 connected to three solvent control valves 3, which are in turn connected to three solvent sources (not shown), respectively. The solvent manifold 5 connects all three solvent valves 3 to the solvent distribution chambers 9 allowing for up to three washes with three different solvents, or, alternatively, one wash with a mixture of up to three solvents. It should be understood, however, that more or less than three valve linking finger members 29, solvent control valves 3, and/or solvent sources may be used with the present invention, depending on manufacturing and/or consumer preferences.

In another preferred embodiment, either thirty-six (36), eighty (80), or three-hundred and fifty-two (352) nozzles 13 may be press fit into each of two nozzle plates 11. In a more preferred embodiment, each nozzle plate 11 contains eighty (80) nozzles 13. This more preferred embodiment allows for a chemical wash of two ninety-six (96) well plates 35, such as Robbins Scientific Flex Chem 96 well multiple synthesis reactor plates. Eighty (80) cells of the ninety-six (96) cells in each reactor plate 35 are preferably used and contain a reaction mixture, with the other sixteen (16) cells (i.e. the two outer rows on two opposite sides of the reactor plates) remaining empty. One or more of these sixteen (16) unused cells may be used for engagement with the alignment pins 37 of the washing station 1, as described above.

In yet another preferred embodiment of the invention, the solvent control valves 3, the positive pressure control valve 19, and/or the negative pressure control valve 21 are solenoid operated valves. The solenoids, in turn, are activated with an electronic controller, as is well-known in the art. An applications program running on a computer controls the electronic controller. The computer controls when the valves 3, 19, 21 are turned on and off in response to commands which are entered into the control program by the operator. For example, the operator can determine which solvent is to be used, determine what order each solvent is applied, and determine the length of the "dwell" time.

In another preferred embodiment of the invention, nozzle plate gaskets 57 are installed between the nozzle plate 11 and the upper housing 7 to seal the solvent distribution chamber 9. These nozzle plate gaskets are fabricated from a thermoplastic rubber, preferably Santoprene.

In still another preferred embodiment of the invention, inner standoffs 53 are provided to support the nozzle plates 11 when the reactor plates 35 are clamped into their positions in the wash station 1 and to support the load applied to the nozzle plates 11 by applying a force to the respective nozzle plate gaskets 57. The inner standoffs 53 also apply pressure to the reactor plates 35 downward against the receptacle gaskets 47, thereby helping to form the tight seal between the reactor plates 35 and the solvent collection chambers 17. As shown in FIG. 2, the inner standoffs 53 may also be adapted to receive and hold the alignment pins 37. The inner standoffs 53 are preferably made of durable material, such as, for example, stainless steel.

While only one inner standoff 53 is shown in FIG. 3 as being positioned near the center of each reactor plate 35 for ease of illustration, preferably a pair of inner standoffs 53 are positioned near the first and last columns (i.e., at the ends) of each reactor plate 35. It should be understood, however, that any desirable number and/or position of the inner standoffs may be used with the wash station of the present invention.

In another preferred embodiment of the invention, outer standoffs 55 are provided to apply pressure to the skirts 45 of the reactor plates 35 downward against the receptacle gaskets 47, thereby helping to form the tight seal between the reactor plates 35 and the solvent collection chambers 17. Preferably, there is an outer standoff 55 positioned on the skirt 45 at each end of the reactor plates 35 outside of the inner standoffs 53.

Preferred solvents for use in the wash station 1 are inorganic solvents such as water, aqueous acids and bases, such as, for example, aqueous sodium hydroxide and aqueous hydrochloric acid. Other preferred solvents are organic solvents such as, for example, methanol, dichloromethane, dimethylformpamide, ethyl acetate, acetone and acetic acid. The solvents used and the order in which they are introduced can be varied substantially based on biological and/or chemical reactions present in the cells.

The present invention also provides a method for purifying a plurality of chemical products simultaneously in a multi-well reactor plate. The method comprises first setting up a plurality of chemical reactions by formulating a plurality of different chemical compounds in a plurality of cells 41 in a reactor plate 35. Next, the chemical reactions are allowed to proceed to completion to afford a series of desired products and a resin support material to which the products are bound chemically. Unreacted constituents are then removed by employing the wash station 1 of the present invention. Finally, cleavage of the resin support material affords the isolated desired product.

The disclosures in this application of all articles and references, including patents, are incorporated herein by reference.

The invention and the manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the spirit or scope of the present invention as set forth in the claims. To particularly point out and distinctly claim the subject matter regarded as invention, the following claims conclude this specification.

What is claimed is:

1. A washing station for washing a plurality of cells in a multi-well container, comprising:

at least one solvent control valve for controlling the flow of solvent into the wash station, the at least one solvent control valve having an end connected to a solvent manifold;

an upper housing having at least one solvent distribution chamber in communication with the solvent manifold;

at least one nozzle plate positioned adjacent to the upper housing and against the at least one solvent distribution chamber;

a plurality of nozzles connected to the at least one nozzle plate;

a receptacle having a solvent collection chamber for each solvent distribution chamber, each solvent collection chamber being capable of holding a reactor plate containing a plurality of reaction cells, the receptacle being capable of being positioned with respect to the upper housing such that each reaction cell is aligned with one of the plurality of nozzles;

a positive pressure control valve for providing positive pressure to restrict flow of solvent out of the reaction cells and into the solvent collection chamber; and a negative pressure control valve for providing negative pressure to remove solvent from the reaction cells.

2. The washing station according to claim 1 wherein the solvent manifold comprises at least one valve linking finger member protruding from the manifold body wherein the at least one solvent control valve is connected to the solvent manifold at the at least one valve linking member.

3. The washing station according to claim 1 wherein the alignment is attained by moving the upper housing in a downward state towards the receptacle resulting in a plurality of tapered alignment pins attached to the upper housing to engage a plurality of unused cells in each reactor plate thereby pulling each reaction cell into precise alignment with the respective nozzle.

4. The washing station according to claim 1 further comprising two side walls providing support for the upper housing.

5. The washing station according to claim 3 further comprising an outer perimeter skirt affixed to a bottom-plate end of the reactor plate, the outer perimeter skirt forming a tight seal with a flexible gasket attached to the respective solvent collection chamber when the upper housing is lowered into the downward state.

6. The washing station according to claim 4 further comprising a toggle clamp mounted to each side wall and a respective toggle clamp bracket mounted on opposing sides of the upper housing, the toggle clamp when engaged with the respective toggle clamp bracket keeping the upper housing in the downward state.

7. The washing station according to claim 6 further comprising at least one spring mounted to a bottom side of the upper housing at one end and to a top side of each side wall at a second end, the at least one spring keeping the upper housing in an upward state when the toggle clamp is disengaged with the respective clamp bracket.

8. A washing station according to claim 2 wherein the solvent manifold contains three valve linking finger members.

9. A washing station according to claim 2 wherein the solvent manifold further comprises at least one chamber linking finger member protruding from the manifold end, the at least one chamber linking finger member connecting the solvent manifold to the at least one solvent distribution chamber.

10. A washing station according to claim 1 wherein the upper housing has two solvent distribution chambers.

11. A washing station according to claim 1 having three solvent control valves.

12. A washing station according to claim 1 wherein at least one of the solvent control valves, the positive pressure control valve, and the negative pressure control valve are electronically controlled solenoid valves.

13. A washing station according to claim 1 wherein each nozzle plate has a plurality of nozzles selected from the group consisting of 36, 80 or 352.

14. A washing station according to claim 1 wherein each nozzle has an internal diameter from between 0.001 to 0.020 inches.

15. A method for simultaneously washing a plurality of reaction cells in a multi-well reactor plate, comprising:

a) placing at least one reactor plate with a plurality of reaction cells into a solvent collection chamber of a receptacle;

b) moving the receptacle into a position directly underneath an upper housing;

c) moving the upper housing and receptacle together to form a seal between the at least one reactor plate and the solvent collection chamber, each reaction cell of the at least one reactor plate being aligned with a nozzle of a nozzle plate positioned between the upper housing and the receptacle;

d) applying positive pressure to each solvent collection chamber;

e) turning on one or more solvent control valves until a desired amount of solvent is present in each reaction cell;

f) allowing the solvent to remain in the reaction cells for a period of time;

g) applying negative pressure to each solvent collection chamber; and h) removing the solvent from the reaction cells.

16. A method according to claim 15 wherein the positive pressure is applied by turning on a positive pressure control valve thereby releasing a gas from a back pressure gas supply and providing a positive flow of gas into each solvent collection chamber.

17. A method according to claim 16 wherein the negative pressure is applied by turning off the positive pressure control valve thereby removing the positive flow of gas into each solvent collection chamber.

18. A method according to claim 16 wherein the positive flow of gas creates a pressure from between 1.0 to 5.0 psi in each collection chamber.

19. A method according to claim 15 wherein the removal of solvent further comprises turning on a negative pressure control valve which creates a vacuum in each solvent collection chamber, the vacuum providing the removal of solvent from the reaction cells.

20. A method for purifying a desired product in a multi-well reactor plate, comprising:

a) formulating at least one chemical compound in a plurality of cells in a reactor plate to set up a plurality of chemical reactions;

b) allowing the chemical reactions to proceed to completion to afford a desired product, a resin support material to which the product is bound chemically, and unreacted constituents;

c) removing the unreacted constituents by employing a wash station, the wash station comprising 1) at least one solvent control valve for controlling the flow of solvent into the wash station, the at least one solvent control valve having an end connected to a solvent manifold;

2) an upper housing having at least one solvent distribution chamber in communication with the solvent manifold;

3) at least one nozzle plate positioned adjacent to the upper housing and against the at least one solvent distribution chamber;

4) a plurality of nozzles connected to the at least one nozzle plate;

5) a receptacle having a solvent collection chamber for each solvent distribution chamber, each solvent collection chamber being capable of holding a reactor plate containing a plurality of reaction cells, the receptacle being capable of being positioned with respect to the upper housing such that each reaction cell is aligned with one of the plurality of nozzles;

6) a positive pressure control valve for providing positive pressure to restrict flow of solvent out of the reaction cells and into the solvent collection chamber; and 7) a negative pressure control valve for providing negative pressure to remove solvent from the reaction cells; and d) cleaving the resin support material from the desired product.

* * * * *